(12) United States Patent
Johnson et al.

(10) Patent No.: US 9,969,435 B2
(45) Date of Patent: May 15, 2018

(54) PILLAR ASSEMBLY TO FLOOR CROSS SUPPORT MEMBER REINFORCEMENT GUSSETS FOR VEHICLE SIDE STRUCTURES

(71) Applicant: Toyota Motor Engineering & Manufacturing North America, Inc., Erlanger, KY (US)

(72) Inventors: Noell G. Johnson, Ann Arbor, MI (US); Corinne D. Uskali, Ann Arbor, MI (US); Jaspreet Singh, Indianapolis, IN (US); Manikandan Babymony, Saline, MI (US); Jonathan R. Young, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days. days.

(21) Appl. No.: 15/255,457

(22) Filed: Sep. 2, 2016

(65) Prior Publication Data

US 2018/0065679 A1    Mar. 8, 2018

(51) Int. Cl.
  *B62D 25/02* (2006.01)
  *B62D 25/04* (2006.01)
  *B62D 25/20* (2006.01)

(52) U.S. Cl.
  CPC .......... *B62D 25/04* (2013.01); *B62D 25/025* (2013.01); *B62D 25/2036* (2013.01)

(58) Field of Classification Search
  CPC ...... B62D 25/02; B62D 25/025; B62D 25/04; B62D 25/2036

USPC .......................... 296/203.03, 193.05, 193.06
See application file for complete search history.

(56) References Cited

U.S. PATENT DOCUMENTS

| | | | | |
|---|---|---|---|---|
| 5,549,349 A * | 8/1996 | Corporon | ............. | B62D 21/157 296/187.12 |
| 5,820,204 A * | 10/1998 | Masuda | ............... | B62D 21/157 296/187.12 |
| 6,129,412 A * | 10/2000 | Tanuma | ............... | B62D 21/157 296/204 |
| 7,237,833 B1 * | 7/2007 | Moll | ................... | B62D 25/087 296/203.04 |
| 8,931,826 B2 | 1/2015 | Yoshimura et al. | | |
| 9,302,711 B2 * | 4/2016 | Ebihara | .................. | B62D 25/08 |
| 9,623,908 B2 * | 4/2017 | Natsume | ................ | B62D 21/06 |
| 9,701,182 B1 * | 7/2017 | Hallman | .............. | B62D 21/157 |

(Continued)

FOREIGN PATENT DOCUMENTS

JP    2000025653    1/2000
JP    4995646    8/2012

(Continued)

*Primary Examiner* — Gregory A Blankenship
(74) *Attorney, Agent, or Firm* — Dinsmore & Shohl LLP

(57) ABSTRACT

A vehicle includes a side member that extends in a vehicle longitudinal direction. A rocker support extends in the vehicle longitudinal direction and is spaced outboard of the side member in the vehicle lateral direction. A C-pillar assembly is coupled to and extends upward from the rocker support. A floor cross member extends in a vehicle lateral direction that is connected to the side member. A pillar assembly to floor cross member reinforcement gusset links the C-pillar assembly and the floor cross member.

20 Claims, 10 Drawing Sheets

(56) References Cited

U.S. PATENT DOCUMENTS

| | | | | |
|---|---|---|---|---|
| 2002/0043814 A1* | 4/2002 | Weiman | B62D 21/09 296/29 |
| 2007/0052260 A1* | 3/2007 | Lassl | B62D 21/157 296/187.12 |
| 2010/0156146 A1* | 6/2010 | Matsuyama | B62D 25/20 296/193.07 |
| 2010/0237659 A1* | 9/2010 | Ishigame | B62D 21/157 296/204 |
| 2011/0049937 A1* | 3/2011 | Fujii | B62D 21/157 296/204 |
| 2012/0181809 A1* | 7/2012 | Kuhl | B62D 25/025 296/30 |
| 2013/0049392 A1* | 2/2013 | Kurogi | B62D 25/02 296/30 |
| 2013/0180790 A1* | 7/2013 | Bisror | B60N 2/005 180/68.5 |
| 2014/0159433 A1* | 6/2014 | Katou | B62D 25/04 296/203.03 |
| 2014/0191535 A1* | 7/2014 | Sugiyama | B62D 25/16 296/193.05 |
| 2014/0284968 A1* | 9/2014 | Park | B62D 25/08 296/193.08 |
| 2015/0001882 A1* | 1/2015 | Saje | B60N 2/015 296/187.12 |
| 2015/0069778 A1* | 3/2015 | Torii | B62D 25/20 296/29 |
| 2015/0137559 A1* | 5/2015 | Lee | B62D 25/087 296/193.07 |
| 2016/0207568 A1* | 7/2016 | Natsume | B62D 21/06 |
| 2016/0297481 A1* | 10/2016 | Yokoi | B62D 25/087 |
| 2016/0311471 A1* | 10/2016 | Iyoshi | B62D 25/04 |
| 2017/0015360 A1* | 1/2017 | Onishi | B62D 21/157 |
| 2017/0036700 A1* | 2/2017 | Patel | B62D 21/157 |
| 2017/0197664 A1* | 7/2017 | Yoshida | B62D 25/088 |
| 2017/0197666 A1* | 7/2017 | Kabayama | B62D 25/2009 |

FOREIGN PATENT DOCUMENTS

| | | |
|---|---|---|
| JP | 2013067201 | 4/2013 |
| JP | 5251569 | 7/2013 |

* cited by examiner

PILLAR ASSEMBLY TO FLOOR CROSS SUPPORT MEMBER REINFORCEMENT GUSSETS FOR VEHICLE SIDE STRUCTURES

TECHNICAL FIELD

The present specification generally relates to reinforcement structures for vehicles and, more specifically, to pillar assembly to floor cross member reinforcement gussets for vehicle side structures.

BACKGROUND

Automotive vehicle bodies may include a variety of structures that provide strength and rigidity to the vehicle in the event of an impact to the vehicle. The underlying structure is generally comprised of a series of sheet metal structures which are joined to create the vehicle body.

In the floor structure of a vehicle, a floor cross support member may be provided to provide lateral support. When a vehicle is impacted from the side, the floor cross support member can transfer energy of the impact from the body structure on the side of impact to the body structure on the opposing side of the vehicle. By transferring this energy, the rigidity and strength of the body framework on the impacted side of the vehicle can be improved.

Accordingly, a need exists for alternative structures for transferring energy and absorbing energy from side impacts.

SUMMARY

In one embodiment, a vehicle includes a side member that extends in a vehicle longitudinal direction. A rocker support extends in the vehicle longitudinal direction and is spaced outboard of the side member in the vehicle lateral direction. A C-pillar assembly is coupled to and extends upward from the rocker support. A floor cross member extends in a vehicle lateral direction that is connected to the side member. A pillar assembly to floor cross member reinforcement gusset links the C-pillar assembly and the floor cross member.

In another embodiment, a pillar assembly to floor cross member reinforcement gusset includes a pillar connecting portion having an outboard end that connects to a pillar assembly of a vehicle and a cross member connecting portion that has an inboard end that links to a floor cross member of the vehicle. The inboard end has a height that is less than a height of the outboard end.

In another embodiment, a method of reinforcing a C-pillar assembly of a vehicle is provided. The method includes connecting a pillar connecting portion of a pillar assembly to floor cross member reinforcement gusset to the C-pillar assembly. A cross member connecting portion of the pillar assembly to floor cross member reinforcement gusset is linked to a floor cross member of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to pillar assembly to floor cross member reinforcement gussets for vehicle side structures. In particular, the pillar assembly to floor cross member reinforcement gussets may be used to interconnect and reinforce pillar assemblies, such as C-pillar assemblies, using floor cross members of the vehicles. In some embodiments, the pillar assembly to floor cross member reinforcement gussets may also be connected to a side member of the vehicle to which the floor cross member is connected. Absorbing energy and transferring energy among the C-pillar assembly, floor cross member and/or the side member may maintain the structural integrity of the cabin of the vehicle and may inhibit intrusion of, for example, a side door structure into the cabin of the vehicle. These and other embodiments will be described in more detail below in reference to the appended drawings.

Figure 1:
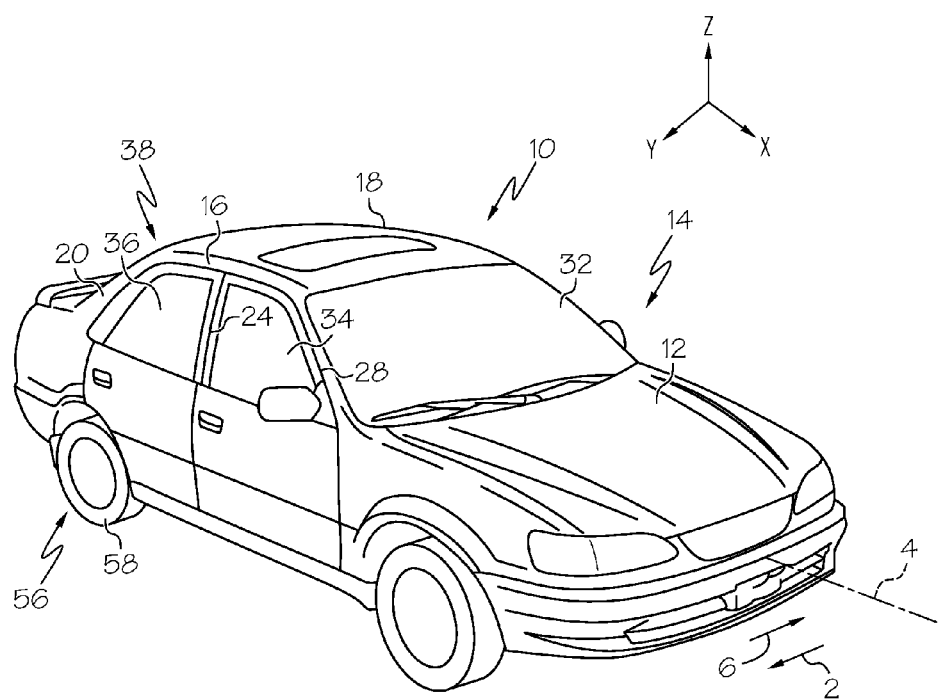
FIG. 1 is a perspective view of a motor vehicle according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Motor vehicles that incorporate elements according to the present disclosure may include a variety of construction methodologies that are conventionally known, including a unibody construction methodology as well as a body-on-frame construction methodology. It should be understood that vehicles that are constructed with body-on-frame or unibody construction may incorporate the elements that are shown and described herein.

Referring to FIG. 1, the vehicle 10 includes a vehicle body 12 including a body framework 14 that includes a pair of side roof rail structures 16 and 18 and various pillar assemblies. The various pillar assemblies are connected to the side roof rail structures 16 and 18 and extend downwardly therefrom in a vehicle vertical direction. These pillar assemblies are generally referred to as the C-pillar assembly 20, the B-pillar assembly 24 and the A-pillar assembly 28. The A-pillar assemblies 28 are located toward the forward end of the vehicle 10, generally between a front windshield 32 and front side windows 34. The B-pillar assemblies 24 are located generally between the front and rear side windows 34 and 36 of the vehicle 10. Finally, the C-pillar assemblies 20 are located between the rear side and rear windows 36 and 38 of the vehicle. Other pillar assemblies, such as D-pillar assemblies may be located rearward of the C-pillar assemblies 20 (e.g., between rear side windows and rear window).

Figure 2:
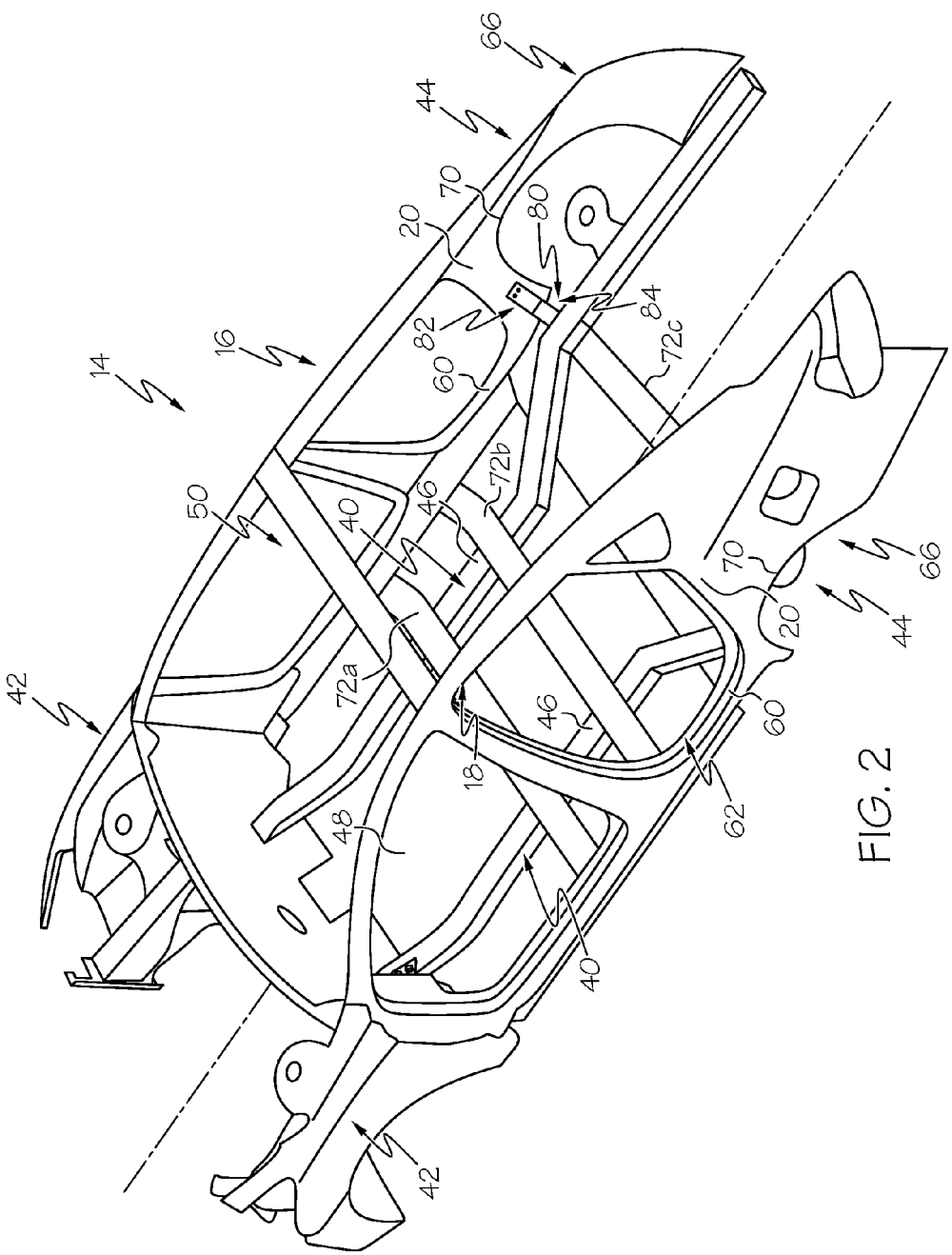
FIG. 2 is a perspective view of a vehicle frame including a pillar assembly to floor cross member reinforcement gusset according to one or more embodiments shown and described herein.

Referring to FIG. 2, the body framework 14 includes a pair of side members 40 that are spaced apart from one another in the vehicle in the vehicle lateral direction. The side members 40 extend in the vehicle longitudinal direction. The side members 40 may extend between at least front suspension mounts 42 and rear suspension mounts 44 that are positioned rearward of the front suspension mounts 42 in the vehicle longitudinal direction. In some embodiments, the side members 40 may be formed integrally along their length. In other embodiments, the side members 40 may be fabricated from a plurality of vehicle structural components that are coupled to one another as to transfer load. In either instance, the side members 40 include a vehicle under member 46 that extends longitudinally along a floor 48 of the vehicle 10. In ordinary vehicle operation, the side members 40 may contribute to overall vehicle stiffness, such that forces introduced to the front suspension mounts 42 and the rear suspension mounts 44 of the vehicle 10 can be reacted by the body framework 14. In vehicle embodiments exhibiting unibody construction, the side members 40 may be integral with the vehicle body 12, such that the side members 40 are incorporated into cabin 50, for example, by the side members 40 forming a portion of the floor 48 of the cabin 50. In other vehicle embodiments, including, for example, vehicle embodiments exhibiting body-on-frame construction, the side members 40 may be separately attached to the cabin 50.

In the depicted embodiments, the front suspension mounts 42 and the rear suspension mounts 44 are coupled to the side members 40. Referring briefly to FIG. 1, a rear suspension unit 56 is coupled to the rear suspension mount 44. As used herein, the rear suspension units 56 may generally include vehicle components that connect the vehicle body 12 to a wheel 58. These components may include control arms, chassis member including a spring and a strut. The spring and the strut may be coupled to a knuckle assembly including a hub. The wheel 58 may be coupled to the hub.

Referring again to FIG. 2, the vehicle body 12 can include a pair of rocker supports 60 that extend in the vehicle longitudinal direction, and are generally parallel to the side members 40 of the vehicle body 12. The pair of rocker supports 60 may be positioned outboard from the side members 40 of the vehicle body 12. The rocker supports 60 may be positioned proximate to a lower portion of a door opening 62 of the cabin 50, and forward of the wheels 58 (FIG. 1) of the rear suspension units 56. The rocker supports 60 may also be positioned proximate to the floor 48 of the cabin 50.

The vehicle body 12 includes the C-pillar assemblies 20. The C-pillar assemblies 20 may extend generally upward in a vertical direction (i.e., in the +vehicle Z-direction) from the pair of rocker supports 60 to support the side roof rail structures 16 and 18. The vehicle body 12 may further include the A-pillar assemblies 28 and B-pillar assemblies 24, as discussed above. The A-pillar assemblies 28, B-pillar assemblies 24, and C-pillar assemblies 20 may each be coupled to the rocker supports 60 of the vehicle body 12.

A pair of wheel well portions 66 are positioned rearward of the rocker supports 60. The wheel well portions 66 may be positioned outboard of the side members 40 in the vehicle lateral direction. The wheel well portions 66 may extend in an outboard direction to a position generally proximate to the rocker supports 60 in the vehicle lateral direction. The wheel well portions 66 may be formed integrally with the C-pillar assemblies 20 or, alternatively, may be coupled to the C-pillar assemblies 20. The wheels 58 (FIG. 1) of the rear suspension unit 56 may be generally positioned at least partially within the wheel well portions 66 and rearward of the rocker supports 60 in the vehicle longitudinal direction. Additionally, the rear suspension units 56 may extend between the rear suspension mounts 44 and the wheel well portions 66 and may be positioned at least partially within the wheel well portions 66. The wheel well portions 66 may accommodate portions of the rear suspension unit 56 that are coupled to and extend in an outboard direction from the rear suspension mount 44 of the vehicle body 12. The wheel well portions 66 may separate the cabin 50 and the rear suspension units 56 that are coupled to the rear suspension mounts 44.

The wheel well portions 66 may include fender panels 70 that may have concave portions that face away from the cabin 50 of the vehicle body 12. The fender panels 70 of the wheel well portions 66 may be shaped to generally accommodate the wheel 58 of the rear suspension unit 56 that is coupled to the rear suspension mount 44.

The vehicle body 12 may include one or more floor cross members 72 that extend between the side members 40. The side members 40 can be connected to each of the floor cross members 72 to provide additional vehicle lateral reinforcement. One or more of the floor cross members 72 may be connected to the rocker supports 60. The floor cross members 72 may include, for example, one or more forward floor cross members 72a, one or more intermediate floor cross members 72b and one or more rearward floor cross members 72c. In the illustrated example, the rearward floor cross member 72c may be at least partially aligned with the C-pillar assemblies 20 in the vehicle lateral direction.

Sides of the vehicle 10 include a pillar assembly to floor cross member reinforcement gusset 80. Embodiments according to the present disclosure may include a pair of pillar assembly to floor cross member reinforcement gussets 80 (driver and passenger sides). Description of one of the pillar assembly to floor cross member reinforcement gussets 80 positioned along one side of the vehicle 10 is made herein for clarity; however, it should be understood that the description made herein may apply to both sides of the vehicle 10. The pillar assembly to floor cross member reinforcement gusset 80 may generally include a pillar connecting portion 82 and a cross member connecting portion 84. The pillar assembly to floor cross member reinforcement gusset 80 can provide structural reinforcement to the connection between the C-pillar assembly 20 and the rocker support 60, thereby increasing the strength and/or stiffness of the connection between the C-pillar assembly 20 and the rocker support 60.

Figure 3:
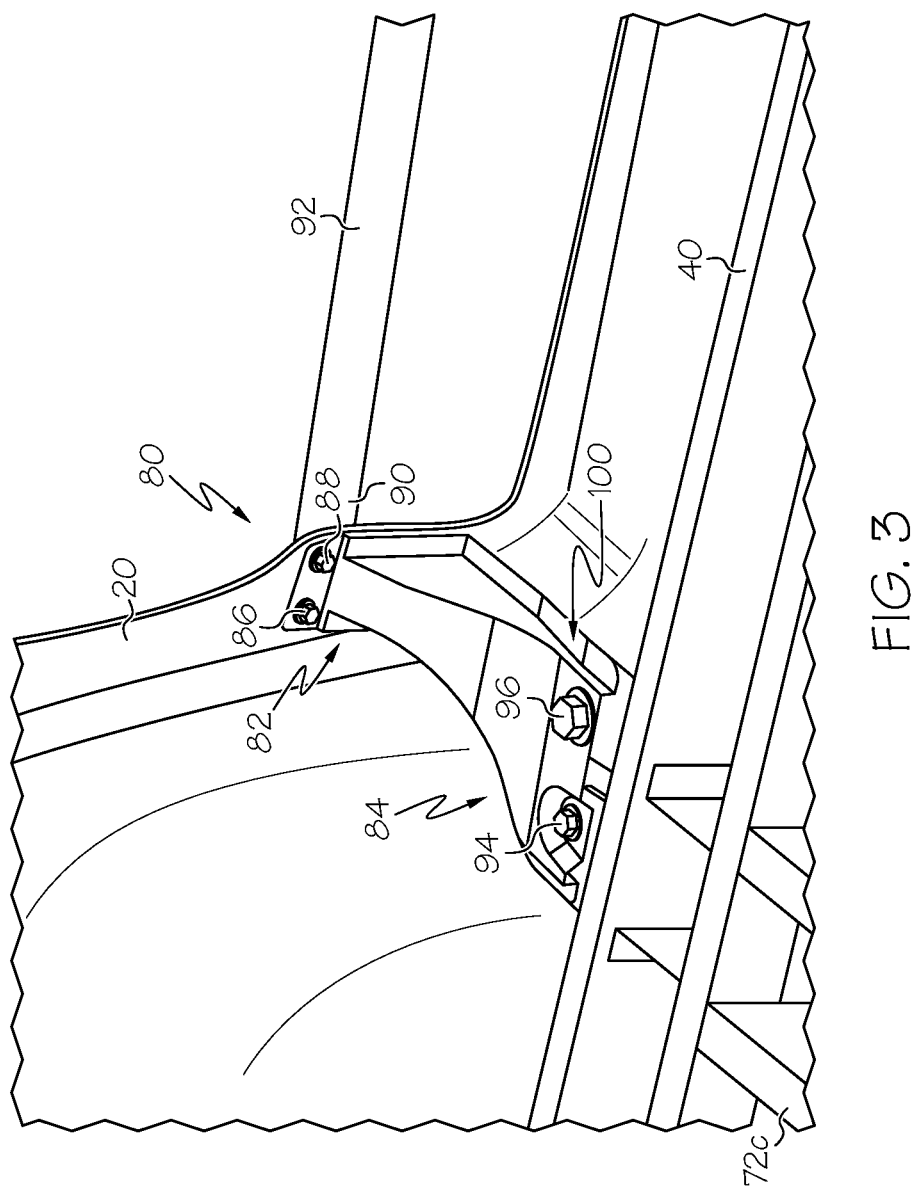
FIG. 3 is a detail view of the pillar assembly to floor cross member reinforcement gusset of FIG. 2.

Referring to FIG. 3, a more detailed view of the pillar assembly to floor cross member reinforcement gusset 80 includes the pillar connecting portion 82 and the cross member connecting portion 84. The pillar connecting portion 82 may be connected directly to the C-pillar assembly 20 using outboard fastener members 86 and 88. As can be seen, the pillar connecting portion 82 may be aligned vertically and laterally with an end 90 of a door reinforcement rod 92, which may be located within a rear door (removed for clarity). The cross member connecting portion 84 may be indirectly connected to the floor cross member 72*c* through the side member 40 and use of inboard fastener members 94 and 96. As can be seen, the cross member connecting portion 84 can be aligned laterally and vertically with the floor cross member 72*c*. As will be described in greater detail below, the pillar assembly to floor cross member reinforcement gusset 80 may be connected to three vehicle structures (referred to herein as a three-point connection): (a) to the C-pillar assembly 20 through outboard fastener members 86 and 88, (b) to the floor cross member 72*c* through the side member 40 and using inboard fastener 94 and (c) to a seat rail assembly 100 (only partially shown by FIG. 3) that may also be connected to the floor cross member 72*c*, which will be described in greater detail below.

Figure 4:
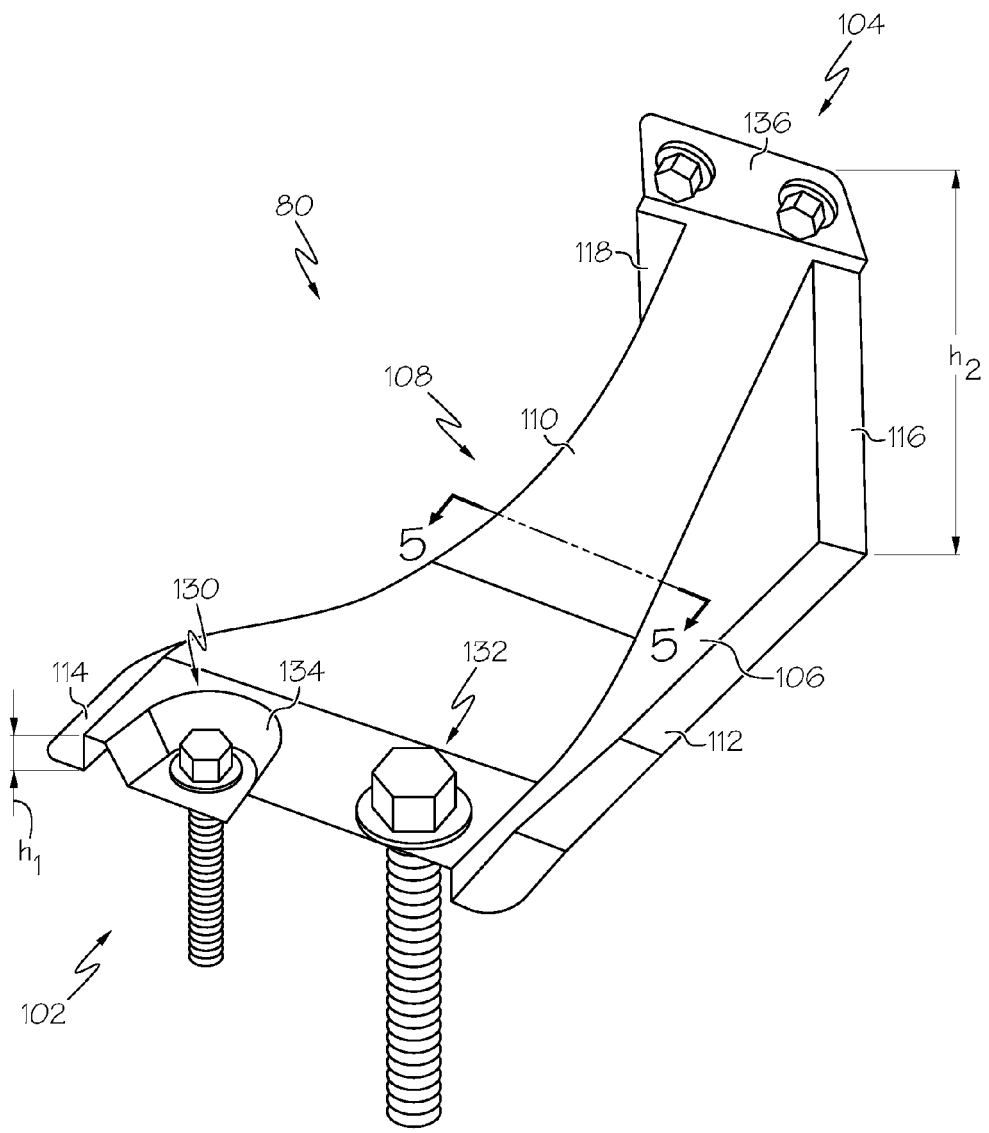
FIG. 4 is a perspective view of the pillar assembly to floor cross member reinforcement gusset of FIG. 3 in isolation.

FIG. 4 illustrates a perspective view of the pillar assembly to floor cross member reinforcement gusset 80 in isolation. The pillar assembly to floor cross member reinforcement gusset 80 includes an inboard end 102 and an outboard end 104 that is opposite the inboard end 102. A front side 106 and a rear side 108 extend between the inboard end and the outboard end 104. The inboard end 102 has a height $h_1$ in the vehicle vertical direction that is much less than a height $h_2$ of the outboard end 104. A top side 110 slopes from the inboard end 102 to the outboard end 104, increasing in height in a ramp-like fashion and connecting the front side 106 and the rear side 108. In some embodiments, the top side 110 may include one or more steps or relatively rapid increases in height from the inboard end 102 to the outboard end 104.

Side flanges 112 and 114 extend outwardly from the front side 106 and the rear side 108, respectively. The side flanges 112 and 114 may provide a base structure for the pillar assembly to floor cross member reinforcement gusset 80 to sit on a support surface. End flanges 116 and 118 also extend outwardly from the front side 106 and rear side 108, respectively. The end flanges 116 and 118 are oriented substantially perpendicular to the side flanges 112 and 114 and may provide a bracing structure against the C-pillar assembly 20 (FIG. 3).

Figure 5:
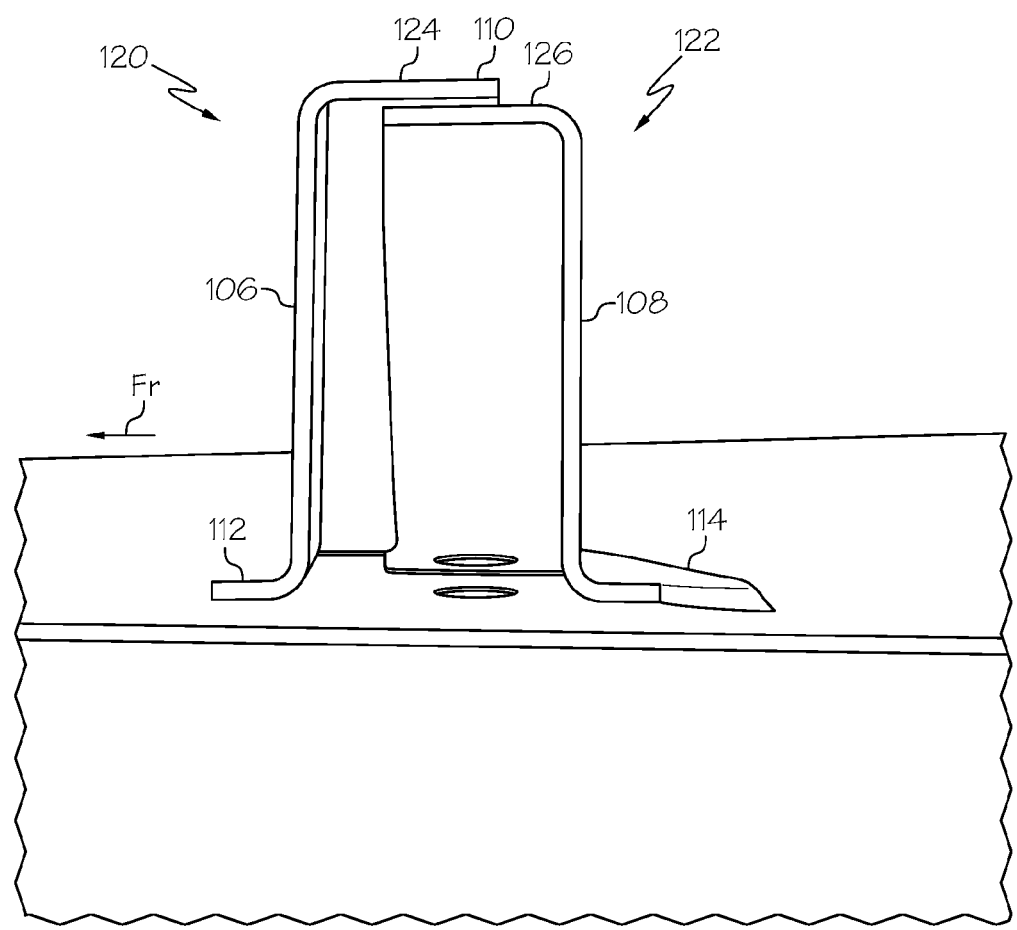
FIG. 5 is a section view of the pillar assembly to floor cross member reinforcement gusset along line 5-5 of FIG. 4.

Referring briefly to FIG. 5, the top side 110 extends between and connects the front side 106 and the rear side 108. In the illustrated example, the pillar assembly to floor cross member reinforcement gusset 80 may be formed of two connected gusset portions 120 and 122. The gusset portion 120 may be a front gusset portion and includes the front side 106 and top portion 124 that forms part of the top side 110. The gusset portion 120 may also include the side flange 112 and the end flange 116 (FIG. 4). The gusset portion 122 may be a rear gusset portion and includes the rear side 108 and top portion 126 that forms part of the top side 110. The gusset portion 122 may also include the side flange 114 and the end flange 118 (FIG. 4). As can be seen, the gusset portions 120 and 122 together form a U-shape in cross section. In other embodiments, the pillar assembly to floor cross member reinforcement gusset 80 may be formed as a single structure, e.g., from a single piece of metal material.

Referring back to FIG. 4, the inboard end 102 and outboard end 104 may be formed of any suitable geometry for connecting to desired surrounding reinforcement structures. In the illustrated embodiment, the inboard end 102 has a relatively low profile (height $h_1$) for connecting to structures near the floor. At the inboard end 102, the pillar assembly to floor cross member reinforcement gusset 80 has fastening locations 130 and 132. The fastening location 130 may be sunk in a recess 134 formed in the top side 110 in order to connect to a cooperating fastening location, while the fastening location 132 may be substantially flush with the top side 110 for connecting with a different cooperating fastening location. At the outboard end 104, the pillar assembly to floor cross member reinforcement gusset 80 may include a top connecting flange 136 that extends outwardly from the top side 110. The top connecting flange 136 may be oriented substantially vertically for connecting to a corresponding surface of the C-pillar assembly 20.

Figure 6:
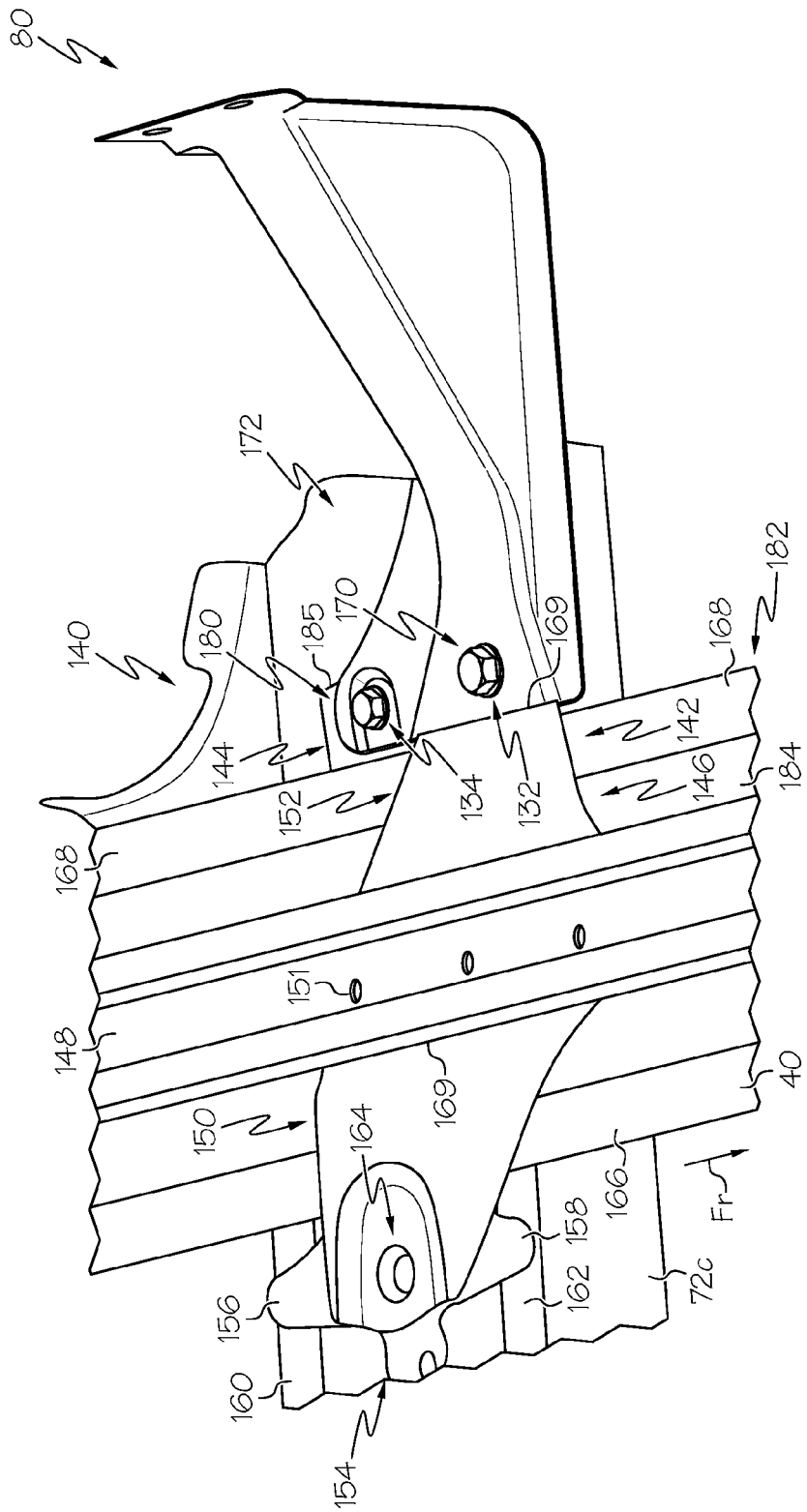
FIG. 6 is another perspective view of the pillar assembly to floor cross member reinforcement gusset of FIG. 3, according to one or more embodiments shown and described herein.
Figure 7:
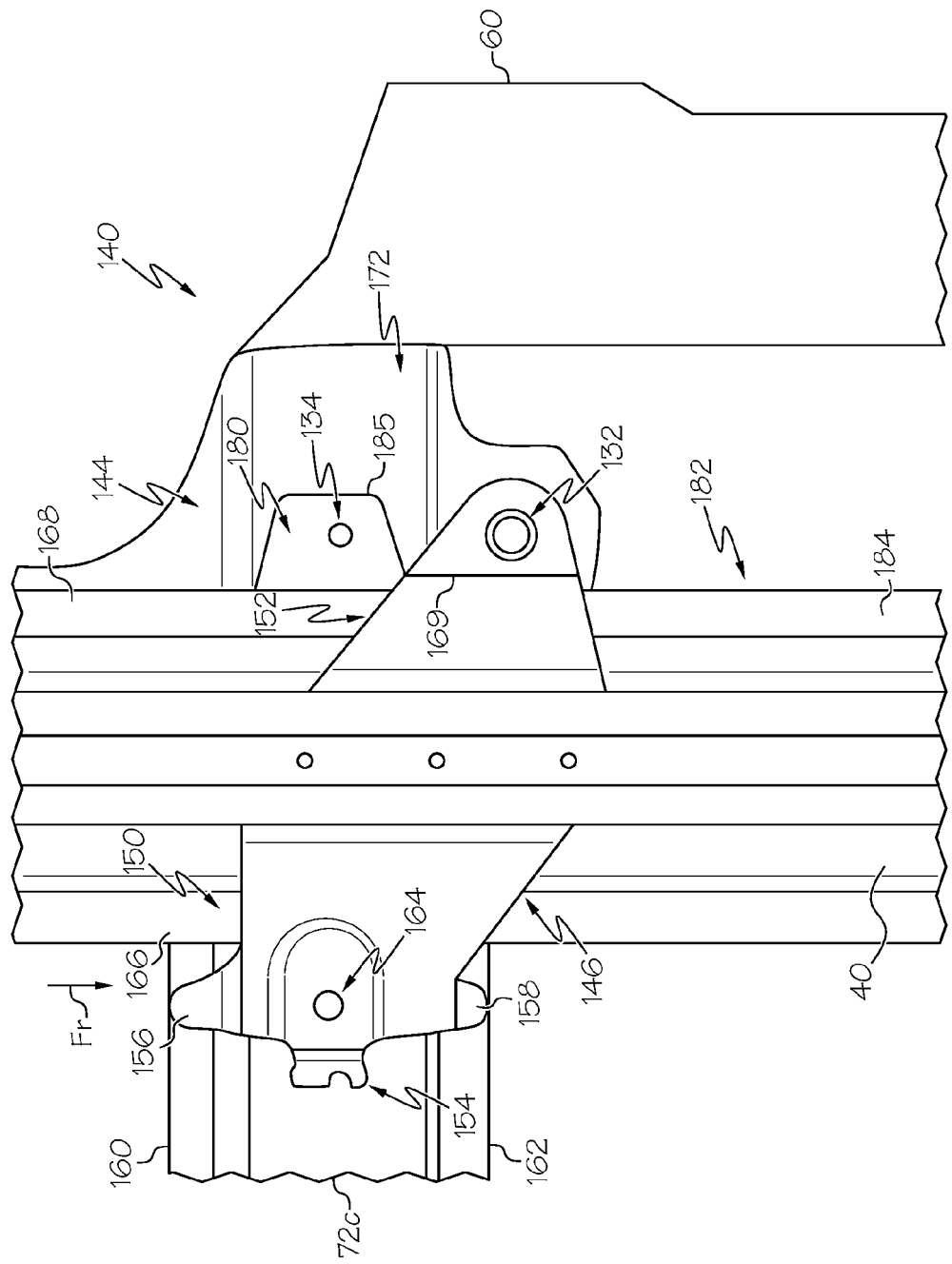
FIG. 7 illustrates a top view of a floor cross member connect assembly for connecting the pillar assembly to floor cross member reinforcement gusset of FIG. 3 to the floor cross member, according to one or more embodiments shown and described herein.

Referring now to FIG. 6, a floor cross member connect assembly 140 is illustrated for connecting the pillar assembly to floor cross member reinforcement gusset 80 to the floor cross member 72*c*. The floor cross member connect assembly 140 includes a seat rail connect assembly 142 and a side member connect assembly 144. The seat rail connect assembly 142 includes a seat rail connecting bracket 146 that is used to connect a seat rail 148 to the side member 40. Fastening locations 151 may be provided for connecting the seat rail 148 to the seat rail connecting bracket 146. Referring also to FIG. 7, the seat rail connecting bracket 146 includes a cross member connecting portion 150 and a gusset connecting portion 152. The cross member connecting portion 150 can be connected to a cross member connecting bracket 154. The cross member connecting bracket 154 may include connecting members 156 and 158 that can each be connected (e.g., welded) to opposite flanges 160 and 162 of the floor cross member 72*c*. The cross member connecting portion 150 of the seat rail connecting bracket 146 may include a fastening location 164 that can be used to connect the cross member connecting portion 150 to the cross member connecting bracket 154.

The cross member connecting portion 150 of the seat rail connecting bracket 146 may extend beyond an inboard flange 166 of the side member 40. The fastening location 164 may be located to the inboard side of the inboard flange 166 of the side member 40 for connecting to the cross member connecting bracket 154 which is, in turn, connected to the floor cross member 72*c*. Referring particularly to FIG. 7, which shows the floor cross member connect assembly 140 without the pillar assembly to floor cross member reinforcement gusset 80, the gusset connecting portion 152 extends beyond an outboard flange 168 of the side member 40. As can be seen, the seat rail connecting bracket 146 may include a bend 169 that allows the gusset connecting portion 152 to descend below the outboard flange 168 for connecting with the pillar assembly to floor cross member reinforcement gusset 80 at fastening location 132. As can be appreciated, the seat rail connecting bracket 146 can provide a link between the pillar assembly to floor cross member reinforcement gusset 80 and the floor cross member 72c.

The pillar assembly to floor cross member reinforcement gusset 80 and the seat rail connecting bracket 146 may also be connected to a side member connecting bracket 172. The side member connecting bracket 172 may be connected to the side member 40 and to another side reinforcement structure, such as the rocker support 60 (e.g., by welding; FIG. 7). The seat rail connecting bracket 146 may be connected to the side member connecting bracket 172 using, for example, the same fastening location 132 where the pillar assembly to floor cross member reinforcement gusset 80 is connected to the seat rail connecting bracket 146, where the same fastening location 132 connects each of the pillar assembly to floor cross member reinforcement gusset 80, the seat rail connecting bracket 146 and the side member connecting bracket 172 together.

Referring still to FIGS. 6 and 7, the side member connect assembly 144 includes a gusset connecting bracket 180. The gusset connecting bracket 180 may be connected (e.g., welded) to an outboard side 182 of outboard wall 184 at a location below the outboard flange 168. Thus, the gusset connecting bracket 180 may be located between the outboard flange 168 and the side member connecting bracket 172. The gusset connecting bracket 180 includes an outwardly extending flange 185 that extends outboard of the outboard flange 168 of the outboard wall 184. The flange 185 of the gusset connecting bracket 180 can be connected (e.g., fastened) to the pillar assembly to floor cross member reinforcement gusset 80 at the fastening location 134.

Figure 8:
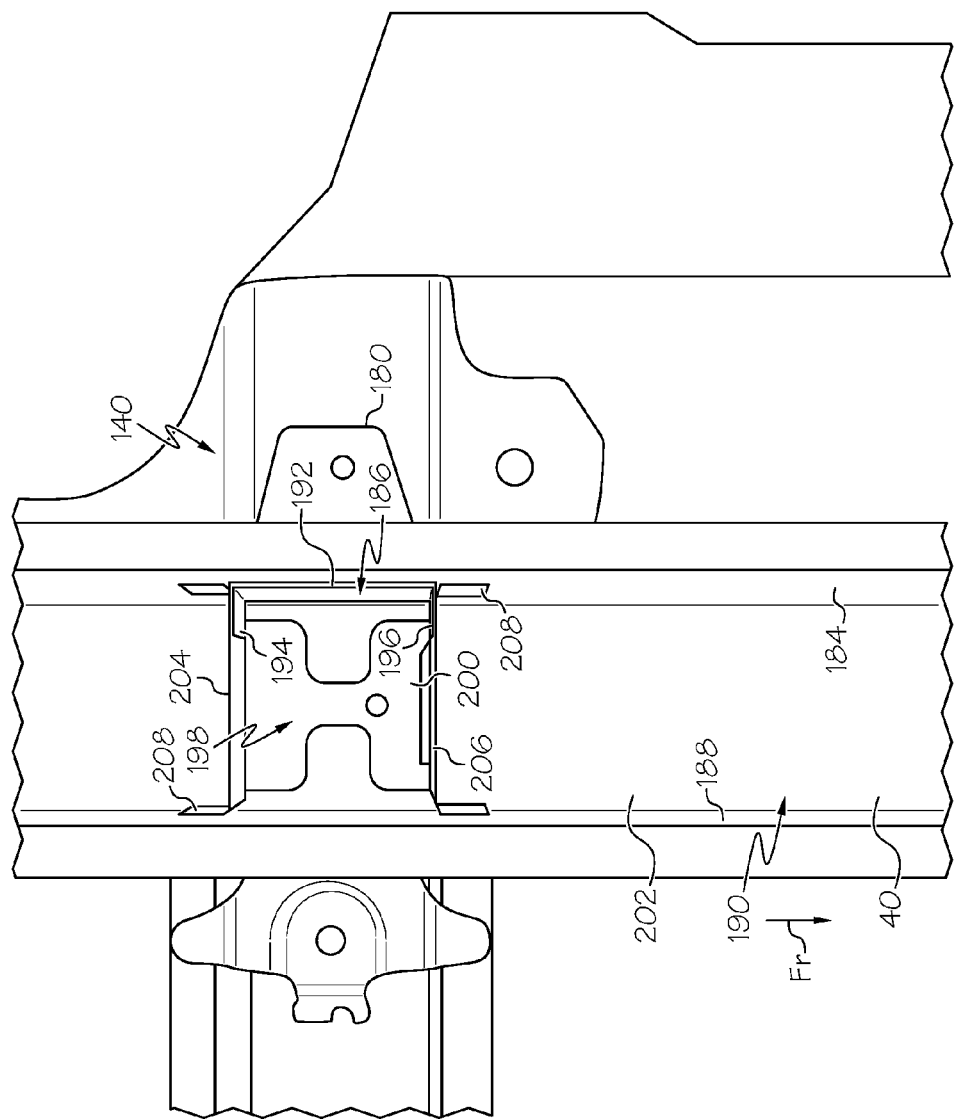
FIG. 8 is another top view of the floor cross member connect assembly of FIG. 7 with a seat rail and seat rail connecting bracket removed, according to one or more embodiment shown and described herein.

Referring now to FIG. 8, the floor cross member connect assembly 140 is illustrated with the seat rail 148 and seat rail connecting bracket 146 removed. The side member 40 includes the outboard wall 184 and an inboard wall 188 forming a channel 190 extending therebetween. A bulkhead connecting bracket 186 may be located in the channel 190 and welded or otherwise connected to the gusset connecting bracket 180 through the outboard wall 184 at an outboard face 192. The bulkhead connecting bracket 186 may include inboard extending flanges 194 and 196 that can be connected (e.g., welded) to a bulkhead bracket 198. The bulkhead bracket 198 includes a floor portion 200 that extends along a floor 202 of the channel 190 and connecting arm portions 204 and 206 that extend outwardly from the floor portion 200 that connect to the bulkhead connecting bracket 186 using the flanges 194 and 196. The arm portions 204 and 206 further include mounting flanges 208 that are mounted (e.g., welded) to the inboard wall 188 and the outboard wall 184 providing lateral reinforcement to the side member 40 within the channel 190 and providing transmission of lateral forces to the floor cross member 72c.

Figure 9:
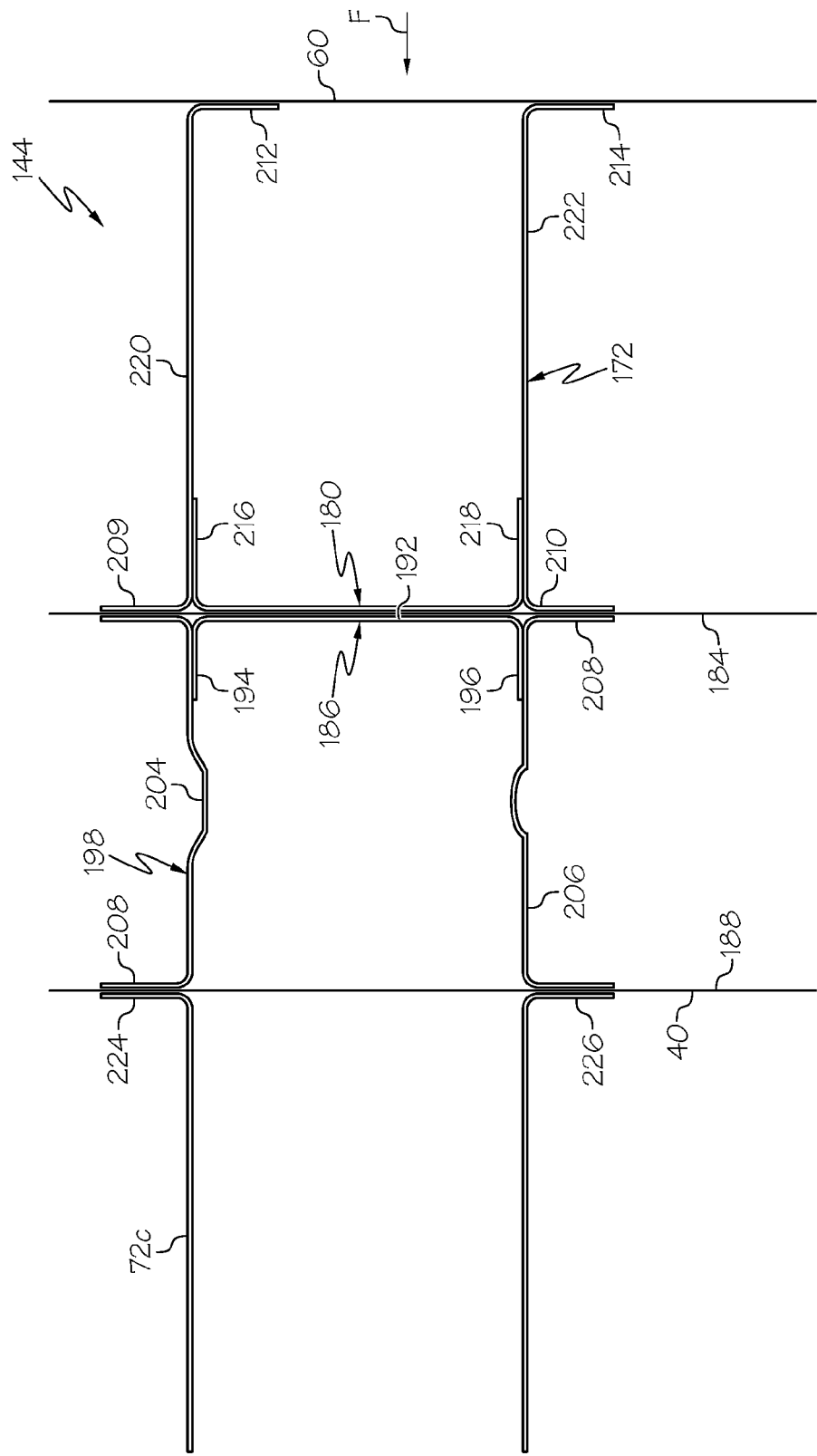
FIG. 9 is a diagrammatic illustration of interconnections of the floor cross member connect assembly of FIG. 8, according to one or more embodiments shown and described herein.

FIG. 9 illustrates the interconnection of the side member connect assembly 144 and force transfer inboard from the side member connecting bracket 172 to the floor cross member 72c. The side member connecting bracket 172 may be connected (e.g., welded) at inboard flanges 209 and 210 to the outboard wall 184 of the side member 40 and may also be connected (e.g., welded) at outboard flanges 212 and 214 to the rocker support 60. As described above, the side member connecting bracket 172 is connected to the pillar assembly to floor cross member reinforcement gusset 80 at the fastening location 132 (FIG. 7).

While the side member connecting bracket 172 may be connected to the side member 40, the gusset connecting bracket 180 may also be provided to connect the side member connecting bracket 172 to the side member 40. The side member connecting bracket 172 may be connected (e.g., welded) to the outboard side 182 of the outboard wall 184 and include flanges 216 and 218 that can be connected (e.g., welded) to sides 220 and 222 of the side member connecting bracket 172. The gusset connecting bracket 180 is also connected to the pillar assembly to floor cross member reinforcement gusset 80 at the fastening location 134 (FIG. 7).

The bulkhead connecting bracket 186 is welded or otherwise connected to the gusset connecting bracket 180 through the outboard wall 184 at the outboard face 192. The inboard extending flanges 194 and 196 can be connected to the bulkhead bracket 198. The bulkhead bracket 198 includes the connecting arm portions 204 and 206 that extend outwardly from the floor portion 200 (FIG. 8) that connect to the bulkhead connecting bracket 186. The arm portions 204 and 206 further include the mounting flanges 208 that are mounted to the inboard wall 188 and the outboard wall 184. The floor cross member 72c can include flanges 224 and 226 that are connected (e.g., welded) to the inboard wall 188.

Figure 10:
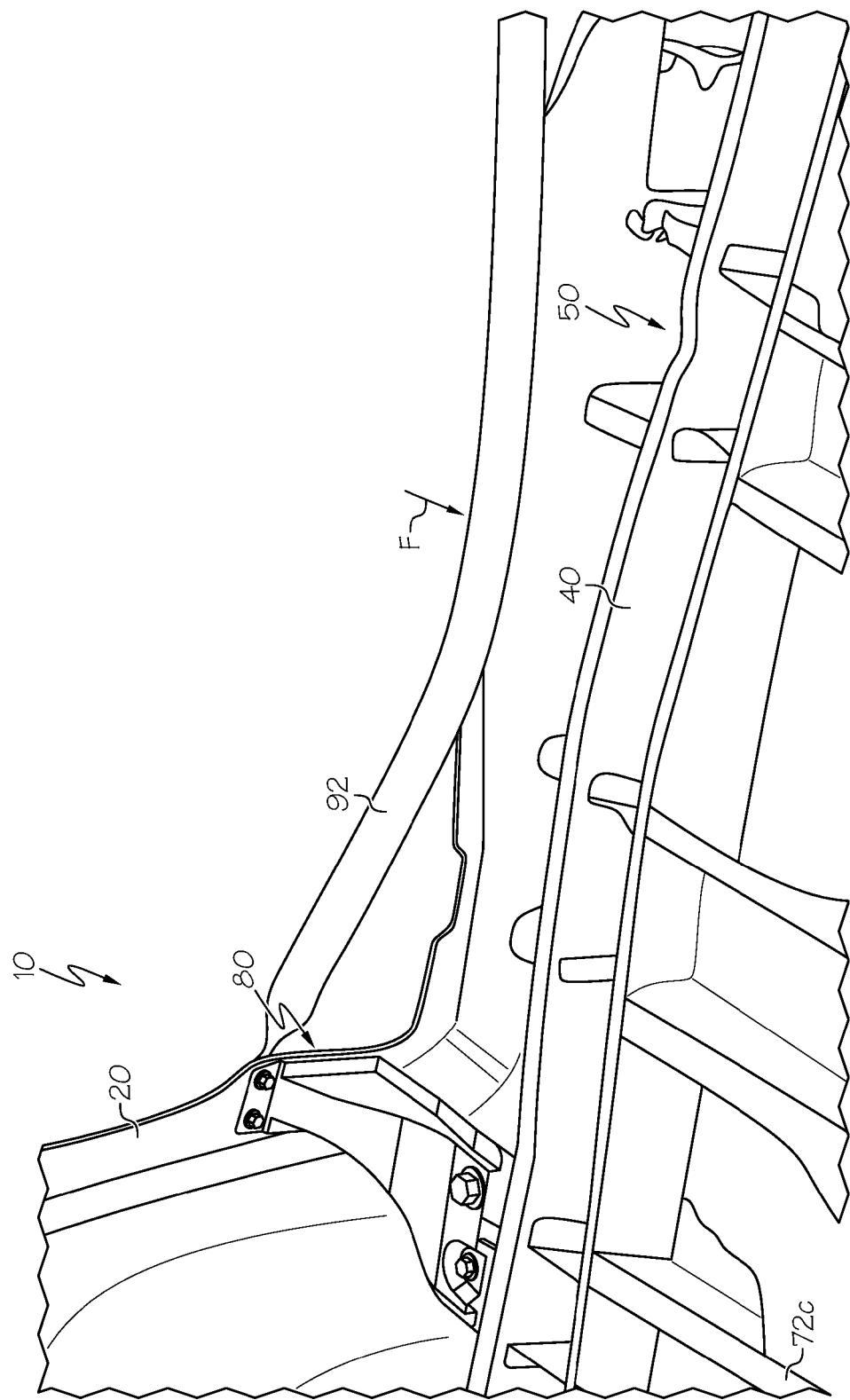
FIG. 10 illustrates operation of the pillar assembly to floor cross member reinforcement gusset of FIG. 2, according to one or more embodiments shown and described herein.

Referring also to FIG. 10, an impact force F applied to side structures of the vehicle 10 can cause elastic and plastic deformation of the various side structures. For example, inboard deformation of the door reinforcement rod 92 may occur where the door reinforcement rod 92 intrudes toward the cabin 50. Such impact force F can also be applied to the C-pillar assembly 20 through the door reinforcement rod 92 and/or directly. Linking of the C-pillar assembly 20 to the floor cross member 72c through the pillar assembly to floor cross member reinforcement gusset 80 as described above can transfer some of the impact force F to the floor cross member 72c and limit intrusion of various side structures inwardly and toward an opposite side of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Directional terms used herein—for example widthwise, lengthwise, vertical, up, down, right, left, front, back, top, bottom, upper, lower—are made only to supply directional context.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A vehicle comprising:
  a side member that extends in a vehicle longitudinal direction;
  a rocker support that extends in the vehicle longitudinal direction and is spaced outboard of the side member in the vehicle lateral direction;

a C-pillar assembly coupled to and extending upward from the rocker support;
a floor cross member that extends in a vehicle lateral direction that is connected to the side member; and
a pillar assembly to floor cross member reinforcement gusset that links the C-pillar assembly and the floor cross member;
wherein the pillar assembly to floor cross member reinforcement gusset is aligned vertically and laterally with an end of a door reinforcement rod.

2. The vehicle of claim 1, wherein the pillar assembly to floor cross member reinforcement gusset includes a pillar connecting portion that is connected to the C-pillar assembly and a cross member connecting portion that is linked to the floor cross member.

3. The vehicle of claim 2, wherein the cross member connecting portion of the pillar assembly to floor cross member reinforcement gusset is linked to the floor cross member through a connection with the side member.

4. The vehicle of claim 3 comprising a gusset connecting bracket connected to the pillar assembly to floor cross member reinforcement gusset that is connected to the side member.

5. The vehicle of claim 4 comprising a side member connecting bracket that is connected to the gusset connecting bracket and the side member.

6. The vehicle of claim 5, wherein the side member connecting bracket is connected to the rocker support.

7. The vehicle of claim 2, wherein the cross member connecting portion of the pillar assembly to floor cross member reinforcement gusset is linked to the floor cross member through a connection with a seat rail connect assembly.

8. The vehicle of claim 7, wherein the cross member connecting portion of the pillar assembly to floor cross member reinforcement gusset is linked to the floor cross member through a seat rail connecting bracket of the seat rail connect assembly.

9. The vehicle of claim 1, wherein the pillar assembly to floor cross member reinforcement gusset is aligned with the floor cross member in a vehicle lateral direction.

10. An assembly that connects a pillar assembly to a floor cross member using a floor cross member connect assembly, the assembly comprising:
a pillar assembly to floor cross member reinforcement gusset comprising:
a pillar connecting portion having an outboard end that connects to a pillar assembly of a vehicle; and
a cross member connecting portion having an inboard end that links to a floor cross member of the vehicle, the inboard end having a height that is less than a height of the outboard end; and
a side member connecting bracket that extends from a rocker support to a side member connected to the floor cross member;
wherein the side member connecting bracket connects the cross member connecting portion to the side member and indirectly to the floor cross member through the side member.

11. The assembly of claim 10, wherein the cross member connecting portion has a first fastening location that connects with the side member of the vehicle.

12. The assembly of claim 11, wherein the cross member connecting portion has a second fastening location that connects with a seat rail connecting bracket that connects to the side member connecting bracket.

13. The assembly of claim 12, wherein the pillar connecting portion has a third fastening location that connects with the pillar assembly.

14. The assembly of claim 10, wherein the gusset includes a top side that slopes from the outboard end to the inboard end.

15. The assembly of claim 14, wherein the gusset further comprises a front side and a rear side, the front and rear sides extending between the inboard end, the outboard end and the top side.

16. A method of reinforcing a C-pillar assembly of a vehicle, the method comprising:
connecting a pillar connecting portion of a pillar assembly to floor cross member reinforcement gusset to the C-pillar assembly such that the pillar assembly to floor cross member reinforcement gusset is aligned vertically and laterally with an end of a door reinforcement rod; and
linking a cross member connecting portion of the pillar assembly to floor cross member reinforcement gusset to a floor cross member of the vehicle indirectly using a floor cross member connect assembly.

17. The method of claim 16 comprising linking the cross member connecting portion of the pillar assembly to floor cross member reinforcement gusset through a connection with a side member of the vehicle.

18. The method of claim 17 comprising connecting the pillar assembly to floor cross member reinforcement gusset to a gusset connecting bracket that is connected to the side member.

19. The method of claim 18 comprising connecting the gusset connecting bracket to a side member connecting bracket that is connected to a rocker support.

20. The method of claim 16 comprising connecting the cross member connecting portion of the pillar assembly to floor cross member reinforcement gusset to a seat rail connect assembly that is linked to the floor cross member.

* * * * *